Aug. 29, 1961  C. S. PHILLIPS  2,998,540
WINDING INSULATORS
Filed Sept. 24, 1959

INVENTOR:
CHESTER S. PHILLIPS
By Sutherland, Poletin & Taylor
ATTORNEYS.

United States Patent Office 2,998,540
Patented Aug. 29, 1961

2,998,540
WINDING INSULATORS
Chester S. Phillips, St. Louis County, Mo., assignor to The Emerson Electric Manufacturing Company, St. Louis, Mo., a corporation of Missouri
Filed Sept. 24, 1959, Ser. No. 842,081
6 Claims. (Cl. 310—214)

This invention relates to insulators between windings of dynamo electric machines, and has particular, though not exclusive, application to the stator cores of small alternating-current induction motors of the split phase, or capacitor type.

These types of motors have a running winding and a starting winding. The coils of one winding are commonly first positioned in the slots of the stator core, and the coils of the other winding are then inserted in the same slots, so that the coils of one winding are radially imposed upon the coils of the other. While the magnet wire of both windings is covered with an insulation, usually in the form of varnish, there exists a voltage potential between the two windings. For this reason, it has been found desirable to place an insulating barrier between these windings both in the slots and between the end reaches of the coils.

Conventionally, individual pieces of insulation have been inserted into each slot, and separate strips of insulation have been inserted between the end reaches of the two windings at each end of the stator. This arrangement is expensive because of the labor involved, and difficulty has been experienced in retaining the insulators in position between the end reaches of the two windings.

Another arrangement of insulation which has found some use, involves an end collar, made in the form of a single strip, with slot insulators extending integrally from it. These insulators are expensive to make, difficult to position properly between the windings, and inadaptable from one motor size or winding to another.

One of the objects of this invention is to provide an insulating barrier, between coils of a dynamoelectric machine, which is economical to manufacture, easy to install, effective to provide a positive insulation between windings, both in the slots and along the reaches between the slots, and which is readily adapted to use with different kinds of windings and sizes of motor.

Another object of this invention is to provide an insulating barrier which may easily be anchored against axial displacement.

Other objects will become apparent to those skilled in the art in the light of the following description and accompanying drawing.

In accordance with this invention, generally stated, in a dynamoelectric machine having spaced, axially extending slots within which coils are radially imposed, an insulating barrier between the coils is provided, made up of spatulate pieces of insulating material, having a head part and a shank part. The shank part extends across and within the slot, throughout the length of the slot, and the head part projects at least through the height of the end reach of one of the coils, and is wider than the center to center span between alternate slots.

The pieces are positioned in such a way that the heads of the pieces project from the same axial end of every alternate slot. Since the heads are wider than the center to center span between alternate slots, they overlap above the slots from which they do not project.

The shanks of the pieces are wider than the slots, and their longitudinal margins are infolded or cupped. To facilitate this infolding, the margins of each shank, at the head end of the shank, are preferably slit transversely.

Preferably, the shank is substantially longer than the length of the slot, so that its free end projects beyond the slot. In this way, "tangential" flattening of the margins on the projection of the shank spreads them beyond the side margins of the slot, and anchors the piece against axial displacement in the direction of the head. The piece is anchored against axial displacement in the opposite direction, by the head itself.

The insulating piece is preferably made of stiffly flexible material, and the shank preferably scored to define the longitudinal margins and initiate the inturning of the margins in the desired direction.

Figure 1:
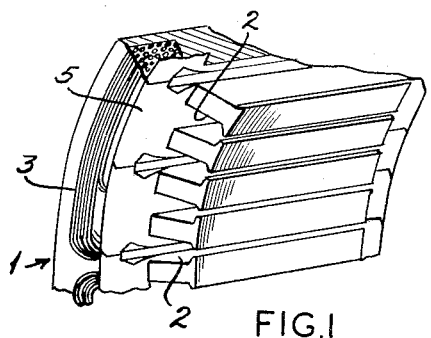
FIGURE 1 is a fragmentary view in perspective showing the insulating barrier of this invention in place in the stator of a split phase motor in which the running winding is in place, but in which the starting winding has not been placed.

Referring now to the drawing for an illustrative embodiment of this invention, reference numeral 1 indicates a stator of a split phase motor, having stator slots 2 extending axially of the stator and radially of the stator bore. Main coils 3 constitute the running winding of the motor and auxiliary coils 4 constitute the starting winding.

Between the main coils 3 and the auxiliary coils 4, is an insulating barrier 5 of this invention. The insulating barrier 5 is made up of a multiplicity of unitary, spatulate pieces of insulating material 6 having a head part 7 and a shank part 8. The piece 6 is symmetrical about its longitudinal axis. The shank part 8 has longitudinal margins 9 defined by score lines 10. The margins 9 are separated from the head 7 by means of transverse slits 11.

Figure 3:
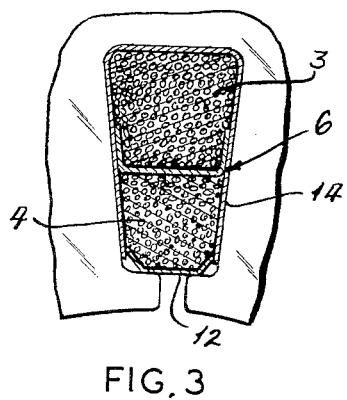
FIGURE 3 is a sectional view, taken radially, through coils in a stator slot.
Figure 4:
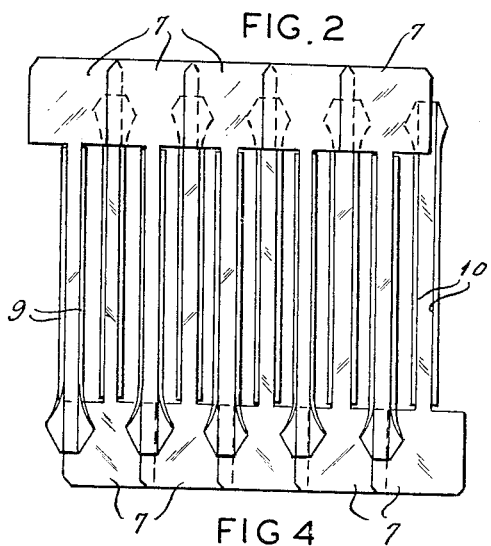
FIGURE 4 is a fragmentary view, in elevation, of insulating pieces showing the way in which the pieces form the insulating barrier of this invention but with the stator omitted for clarity.

An insulating wedge 12, shown in FIGURE 3, is conventional, as is a slot insulator 14, also shown in FIGURE 3.

Figure 5:
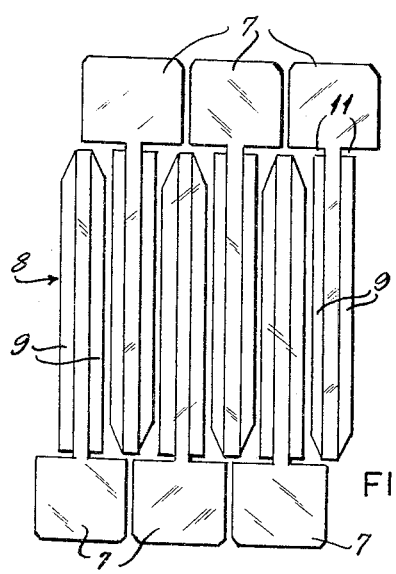
FIGURE 5 is a fragmentary top plan view of a strip of stock of insulating material, from which the insulating pieces of this invention are being blanked; and, FIGURE 6 is a view in perspective of one of the insulating pieces of this invention.
Figure 6:
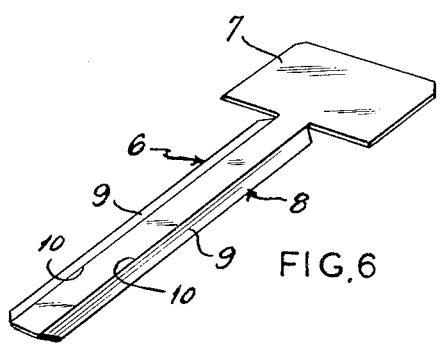

In the manufacture of the spatulate pieces, a strip of insulating material stock is provided which is slightly wider than the length of the shank plus twice the height of the head. The pieces are then blanked out in nested relationship, as shown in FIGURE 5, with very little waste material. The scoring of the lines 10 initiates the inturning of the margins 9.

Figure 2:
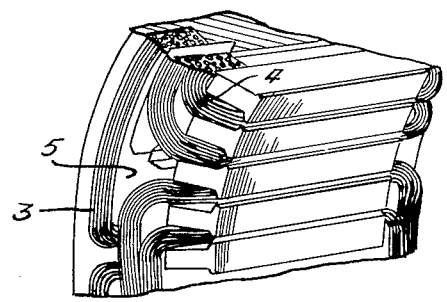
FIGURE 2 is a fragmentary view in perspective of the stator of the split phase motor shown in FIGURE 1, with the starting winding in place.

As illustrated in FIGURES 1 and 2, one winding is placed in position initially. The insulating barrier 5 is then formed by inserting the shanks of the spatulate pieces, with the margins inturned in the direction of the coils, as shown in FIGURE 3, into one set of alternate slots at one end, and into the other set of alternate slots in the other, until the head of each piece abuts the stator or ends of slot insulators 14, and the free ends of the shank project at the other end. While in practice, the insulating pieces have been put in from one end first, and then from the other, in such a way that the free ends of the shanks at one end are radially inward of the heads, while the shanks on the other end are radially outward of the head, the pieces can be inserted simultaneously from each end, and the shanks can be guided in such a way as to be on the same radial side of the heads at each end.

When the insulating pieces have been inserted, the projecting ends of the shanks are flattened tangentially. In practice, this is accomplished as in incident of forcing the main coils 3 into the bottom of the slots and forming the end reaches of the coils radially outwardly with a forming fixture. One of the virtues of the insulating barrier of this invention is that in such forming of the coils, the individual insulating pieces slide readily over each other, and conform to the inner surface of the end reaches of the coils, without interfering with the forming operation, and without rupturing or otherwise destroying the integrity of the barrier, the overlap of the head parts being sufficient to insure that no gap in the insulating barrier is produced.

The auxiliary winding 4 is then inserted in the slots, and conventional slot wedges 12 are then inserted. After the proper winding connections are made, the wound stator may be given a second forming to allow adequate clearance for a rotating vent fan or switch actuator mounted on a rotor positioned in the stator bore. However, as in the first forming operation described, the heads of the insulating pieces will slide with respect to one another, though not sufficiently to separate from one another, and will nest neatly between the end reaches of the coils, providing an effective barrier between them.

It can be seen that the same insulating pieces can be used in different winding arrangements, and even with different slot spacings, so long as the heads are wide enough to provide an overlap, and high enough to provide an insulating barrier between the ends of the coils.

Numerous variations in the construction of the insulating barrier of this invention, within the scope of the appended claims, will become apparent to those skilled in the art in the light of the foregoing disclosure. For example, the specific shape of the head and shank portions can be varied. The overlapping of the head parts can be varied from the shiplap arrangement shown in the illustrative drawing as, for example, to a batten lap. The score lines need not extend through the full length of the shank, although that is the preferred arrangement since the making of the score lines tends to cup the margins of the shank so as to direct the inturning of the margins as the shank is inserted in a slot. In some applications, for example in the insertion of the pieces by machine, it may not be necessary or even desirable to score the shank at all.

Thus it can be seen that an insulating barrier is provided which can be manufactured easily and economically, which can be installed in a dynamoelectric machine readily, which adapts itself to the manufacturing operations of such a machine, and which is highly effective.

Having thus described the invention, what is claimed and desired to be secured by Letters Patent is:

1. A dynamoelectric machine having spaced, axially extending slots, a plurality of coils radially imposed upon one another in said slots, and an insulating barrier between said coils, said insulating barrier comprising separate spatulate pieces of insulating material each having a head part and a shank part, said shank part extending through and across and projecting, at its free end, beyond a slot and being positioned between said coils, and said head part being at least as high as the axial projection of one of said coils from the slot and wider than the center to center span between alternate slots, the head part of every piece being positioned at the opposite end of the slot in which the shank part lies, from the head part of the piece in the immediately adjacent slot, said head part of the pieces in alternate slots and the projecting end of the shank in the intermediate slot being all radially imposed with respect to one another.

2. A dynamoelectric machine having spaced, axially extending slots, a plurality of coils radially imposed upon one another in said slots, and an insulating barrier between said coils, said insulating barrier comprising separate spatulate pieces of insulating material each having a head part and a shank part integral with said head part, said shank part being positioned, within a slot, between said coils, and said head part being at least as high as the projection of one of said coils from the slot, and wider than the center to center span between alternate slots, the head part of every piece being positioned at the opposite end of the slot in which the shank part lies, from the head part of the piece in the immediately adjacent slots, said head parts of pieces in alternate slots being in overlapped relation to one another.

3. The dynamoelectric machine of claim 2 wherein, in the insulating barrier pieces, the shank is wider than the slot, and has longitudinal margins inturned in said slot, and the margins of the shank, at its head end, are slit laterally to permit the infolding of the longitudinal margins thereof.

4. The dynamoelectric machine of claim 1 wherein, in the insulating barrier pieces, the shank is wider than the slot along its length within the slot and through at least a substantial portion of the projection from said slot of the free end of the shank, whereby tangential flattening of said projection anchors the piece against axial displacement in the direction of said head.

5. The dynamoelectric machine of claim 2 wherein the insulating barrier is made up of spatulate pieces of stiffly flexible material.

6. The dynamoelectric machine of claim 2 wherein in the insulating barrier, the head parts of pieces in alternate slots are overlapped in shiplap arrangement.

References Cited in the file of this patent

UNITED STATES PATENTS

| 2,443,455 | Herman | June 15, 1948 |
| 2,615,944 | Carlson | Oct. 28, 1952 |
| 2,861,203 | Luneau et al. | Nov. 18, 1958 |
| 2,921,208 | Morrill | Jan. 12, 1960 |

FOREIGN PATENTS

| 755,193 | Great Britain | Aug. 15, 1956 |